June 21, 1960 R. C. HARRIS 2,942,134
GAP BRIDGING MATERIAL
Filed March 16, 1955
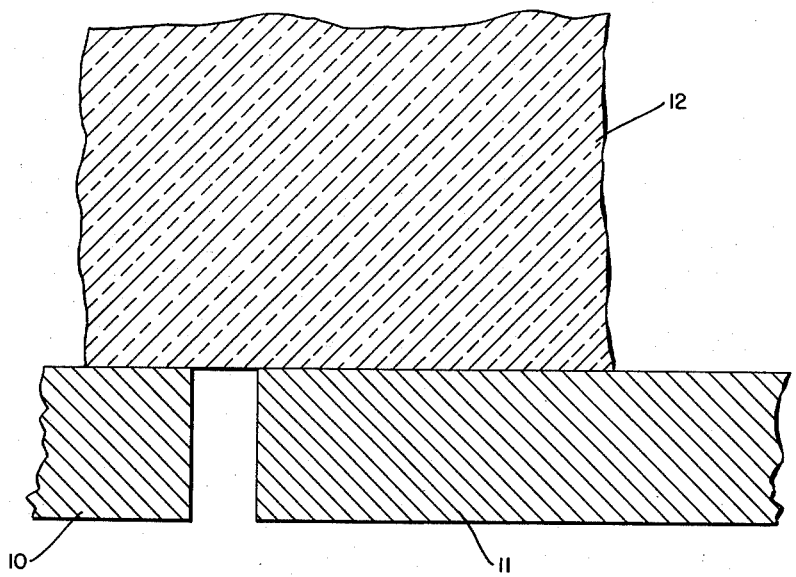
INVENTOR
ROBERT C. HARRIS
BY *Bauer and Seymour*
ATTORNEYS

United States Patent Office 2,942,134
Patented June 21, 1960

2,942,134

GAP BRIDGING MATERIAL

Robert C. Harris, Unadilla, N.Y., assignor to Bendix Aviation Corporation, Sidney, N.Y., a corporation of Delaware Filed Mar. 16, 1955, Ser. No. 494,825

9 Claims. (Cl. 313—131)

This invention relates to igniters and particularly to igniters of the ionized gap type in which electrodes provide a spark gap which is ionized by a gap bridge that overlies the gap. In such igniters the gap bridge is made of ceramic and is a better conductor than the gap, and the invention also includes gap bridges of new construction and gap bridges of new constitution. The ceramics of this invention also find a more general use as semiconductors, and as such are useful in other fields.

In the construction of igniters for jet engines particular problems have arisen from the particular conditions existing in the firing chamber and have prompted the development of an igniter in which the spark gap is overlaid by a gap bridge of ceramic which is neither a good conductor nor a good insulator. In theory the gap bridge allows a reluctant flow of current to ionize the combustible mixture between the electrodes and promote proper firing at a selected, more uniform and lesser tension than can be achieved across an unbridged gap. Among the problems of such igniters are porosity, density, conductivity, uniformity, manufacture, durability under conditions of use, contamination, and change of properties by use.

Among particular problems is that of securing a surface flow of current through the bridge, to prevent shorting through the center of the piece, and to develop a method of manufacture adapted to vary the resistivity and conductivity of the piece at will.

It is an object of this invention to make an improved igniter, having an improved gap bridge, by an improved method of manufacture.

The accompanying drawing, illustrating a typical igniter gap in which the present invention may be advantageously employed, consists of a single figure schematically showing a portion of such gap in vertical section.

The objects are attained as to composition by making the gap bridge of titanium dioxide, zirconium silicate, and kaolin clay.

The objects are attained as to process by making the bridge gap of a plurality of ingredients which are reducible only with difficulty even in the presence of hydrogen and a third which is readily reducible in hydrogen at a moderate firing temperature. 1400° F. is in the range of moderate firing temperatures. The electromotive force series shows that oxides of Li, Rb, K, Sr, Ba, Ca, Na, Mg, Al, Be, U, Mn, are not reducible even in a hydrogen atmosphere, but that the oxides below Mn are reducible. Nevertheless, I have shown that under moderate firing conditions $ZrO_2SiO_2$ does not reduce appreciably in hydrogen, that under like conditions $TiO_2$, $CuO$, $NiO$ and $CrO_2$ are reduced, and that kaolin clay while not reducing appreciably will enter into some reaction with both groups. By choosing a reducible member from the foregoing group and combining it with the clay and the zirconium silicate and firing it at moderate temperature, one can produce excellent gap bridges of various qualities. I have also discovered how to vary quality by altering firing conditions. Finally, by mechanical treatment of the product I have improved its performance.

The following specific example illustrates the invention:

| Materials | Percent by Weight | Formula Weights |
|---|---|---|
| $TiO_2$ | 40 | 20 lbs. |
| $ZrO_2SiO_2$ mol for mol | 30 | 15 lbs. |
| Kaolin clay | 30 | 15 lbs. |
| | 100 | 50 lb. batch. |

All equipment—ballmill, pebbles, pans, granulator, and mixer—must be carefully cleaned before and after processing to prevent contamination of subsequent batches of other compounds.

Ball mill charge:
    Grinding media _____ ¾″ to 1½″ diameter porcelain or alumina pebbles.
    Amount of pebbles __ ⅓ to ½ volume of mill.
    Batch weight _____ 50 pounds.
    Water _____ 5 gallons.

The batch shall be milled a total of four (4) hours. At the end of the first two (2) hours, the mill shall be stopped, the cover removed, and any caked batch scraped into the mill.

After four hours of milling, an additional two gallons of water shall be added, the mill run five minutes longer, and the liquid batch shall be poured into clean pans for drying. The mill and pebbles shall be rinsed with one gallon of water by revolving the mill and contents for ½ minute, and draining the rinse water into one of the drying pans.

The pans and contents shall be oven dried at 200±10° F. until the moisture content is less that 0.5%.

The dry material shall be granulated through a 24 mesh screen, and shall be stored in a clean, dry container.

Percent by weight of binder
Powdered ceramic _____ As above prepared
Piccolastic resin _____ 16.41
Esso caloria oil _____ 8.34
Sterotex _____ 3.46

The dry ceramic powder from storage is weighed to the nearest 0.2 lb. and the recorded weight given for calculation of the required organic binders.

The total amount of hot mix material may be placed in a clean hot-mixer of the Beken type, and mixed while steam at 35 to 50 p.s.i. circulates through the jacket. Mixing shall continue for one hour from the time the material becomes plastic. The mixer walls should be kept free of unmixed batch. The batch is cooled by circulating cold water through the mixer jacket, and the mixing action shall be used only to break up the batch as it cools. Three minutes mixing every 15 minutes is sufficient. When the batch is cool enough to handle, it is transferred to a muller type mixer, and is mixed just long enough to reduce the lumps sufficiently to pass through an 8-mesh sieve. Excessive mixing is to be avoided because of the possibility of metal contamination.

The powdered batch may be stored in clean, dry, covered containers. Loss on ignition testing may be carried out at this point by heating a weighed sample of the batch to 1000±100° C. and determining the weight loss as a percentage figure based on the initial weight. At this point attention is drawn to U.S.P. Serial No. 197,908, November 28, 1950, which relates to useful methods.

A preform is made by taking a batch from storage, which shall be dry-pressed at 500 p.s.i. into slugs 1¾" diameter weighing 40±5 grams.

The preforms shall be heated in a suitable oven until they attain a degree of plasticity consistent with good molding technique. A temperature of 325° F. for 15-20 minutes is usually sufficient. Molding force on the order of 10 tons, and the mold shall be preheated to approximately 110° F.

Molded units shall be placed in suitable trays, and shall be baked in the standard production conveyor oven to remove enough of the organic material to permit firing to the proper temperature as determined by pyrometric cones.

The units shall be set with the large diameter down on suitable refractory slabs; the slabs shall be placed in a suitable kiln and fired to pyrometric cone 15 down in approximately 8 hours.

The units from the burn may require a face-off operation on the end of the smaller O.D. to ensure a face flat and square to the thread axis. This cut may be made with a diamond wheel to a depth sufficient to contact all of the surface of the ceramic.

In order to make the ceramic insulator into a satisfactory gap bridge it must be subjected to reduction, by heating the units in a hydrogen atmosphere to 1400±20° F. and holding the units at this temperature for 30±2 minutes. Hydrogen flow shall be at a rate equivalent to .15±.05 liters of gas per minute into the furnace at a pressure corresponding to 1.65±.25 inches of water. Because of possible contamination of the hydrogen by water vapor, an oil of known specific gravity shall be used in the open end manometer and corrected for height of water. This produces a generally satisfactory gap bridge but its qualities can be altered in several ways.

Control of product properties is by time of firing, temperature of firing, and by composition as above indicated, but the simplest is to leave all other conditions alike and vary the temperature. The reduction of the reducible component penetrates in proportion to the porosity of the material and the time of treatment. Thus an impervious object would receive only a surface of improved conductivity when treated as in the example but a porous body would be penetrated and reduction would proceed to a greater depth. Even dense and vitrified objects are penetrated if sufficient time is allowed in the reducing atmosphere at the firing temperature.

Thus, with one composition one may produce different resistance values with no variation save of time or temperature. The preferred piece has an interior of high dielectric value as there is less chance of dielectric breakdown through the interior. To concentrate the current flow near the gap it is useful to grind off the conductive surface in all places except where improved conductivity is desired. This is important because it lets one mechanically put the current next to the spark gap.

This is also good for the thermal shock resistance of spark plug ceramics as the piece remains centrally dense and fuel and carbon are not readily absorbed.

In applying the above example to produce a more conductive piece one can increase the firing temperature by 25° units until the precise conductivity desired is attained. Alternately one can heat at the same temperature for an extended period. Finally one can vary the content of the reducible oxide.

As a final product for jet engine igniter use the ternary compound containing $TiO_2$ as the reducible oxide is unequalled. It is better to vary the properties of this compound by heat treatment than to vary the composition by the substitution of other reducible oxides.

In the single figure of the drawing there is shown a fragment of the bottom or inner, gap-containing end of a spark plug. When the plug is installed in an engine, such bottom end of the plug is in direct connection with the combustion chamber of the engine. The spark gap is formed between a first electrode 10, which may be the center electrode of the spark plug, and a second electrode 11, which may be the outer electrode of the spark plug. A ceramic body 12, which has the lower portion thereof electrically semi-conducting is positioned across the electrodes 10 and 11 with its lower surface firmly in contact with the upper surfaces of the electrodes. The ceramic body 12 is made in accordance with the present invention.

As many apparently widely different embodiments of the present invention may be made without departing from the spirit and scope thereof, it is to be understood that the invention is not limited to the specific embodiments.

What is claimed is:

1. A refractory ceramic semiconductor which is the fired reaction product of a mixture consisting essentially of kaolin clay, zirconium silicate, and titanium dioxide in a partially reduced condition, the kaolin clay and zirconium silicate being present in substantially the same amounts by weight, the titanium dioxide being present in an amount which is generally on the same order as each of the other two essential ingredients.

2. A refractory ceramic semiconductor which is the fired reaction product of a mixture consisting in its essential elements of kaolin, zirconium silicate, and titanium dioxide in the ratio, by weights, of about 30:30:40, respectively.

3. An igniter having electrodes providing a spark gap, and a gap bridge which is the fired reaction product of a mixture consisting in its essential ingredients of about 30% kaolin clay, about 30% zircon silicate, and about 40% titanium dioxide, the titanium dioxide in the gap bridge being in a partially reduced condition.

4. In an igniter having electrodes providing a spark gap, and a gap bridge overlying the gap, the improved bridge consisting of a ceramic containing a reducible oxide of a conductive metal, said oxide having been partly reduced in the area overlying the gap.

5. The method of making a gap bridge that comprises preparing a ceramic composition containing at least one oxide readily reducible in hydrogen at moderate firing temperature, at least one refractory oxygenated compound irreducible under like conditions, and kaolin, molding the composition to form a gap bridge, subjecting the molded gap bridge to a first firing to form a ceramic bond within the gap bridge, and then firing the ceramic in a reducing atmosphere containing hydrogen.

6. The method of making a ceramic body of semiconductive properties that comprises preparing a ceramic composition containing at least one oxide readily reducible in hydrogen at moderate firing temperature, at least one refractory oxygenated compound irreducible under like conditions, and kaolin, molding the composition to form the body, subjecting the molded body to a first firing to form a ceramic bond within the body, and then firing the ceramic in a reducing atmosphere containing hydrogen for a period of time sufficient to cause the reduction of such reducible oxide, and terminating the firing before the reduction has penetrated into the center of the body.

7. The method of making a ceramic body of semiconductive properties that comprises preparing a ceramic composition containing at least one oxide readily reducible in hydrogen at moderate firing temperature, at least one refractory oxygenated compound irreducible under like conditions, and kaolin, molding the composition to form the body, subjecting the molded body to a first firing to form a ceramic bond within the body, and then firing the ceramic in a reducing atmosphere containing hydrogen for a period of time sufficient to cause the reduction of such reducible oxide, terminating the firing before the reduction has penetrated into the center of the body, and removing the reduced layers from all but one face of the body.

8. The method of claim 5 in which the irreducible refractory compound is zirconium silicate.

9. The method of claim 5 in which the irreducible refractory compound is zirconium silicate and the reducible oxide is titanium dioxide.

References Cited in the file of this patent

UNITED STATES PATENTS

| | | |
|---|---|---|
| 1,370,276 | Buckman | Mar. 1, 1921 |
| 1,467,810 | Pilling | Sept. 11, 1923 |
| 1,842,433 | Terwilliger | Jan. 26, 1932 |
| 2,040,051 | Klingler | May 5, 1936 |
| 2,289,211 | Ridgway | July 7, 1942 |
| 2,578,754 | Smits | Dec. 18, 1951 |
| 2,684,665 | Tognola | July 27, 1954 |
| 2,699,522 | Breckenrdige | Jan. 11, 1955 |
| 2,766,509 | Le Loup et al. | Oct. 16, 1956 |